United States Patent Office 3,092,179
Patented June 4, 1963

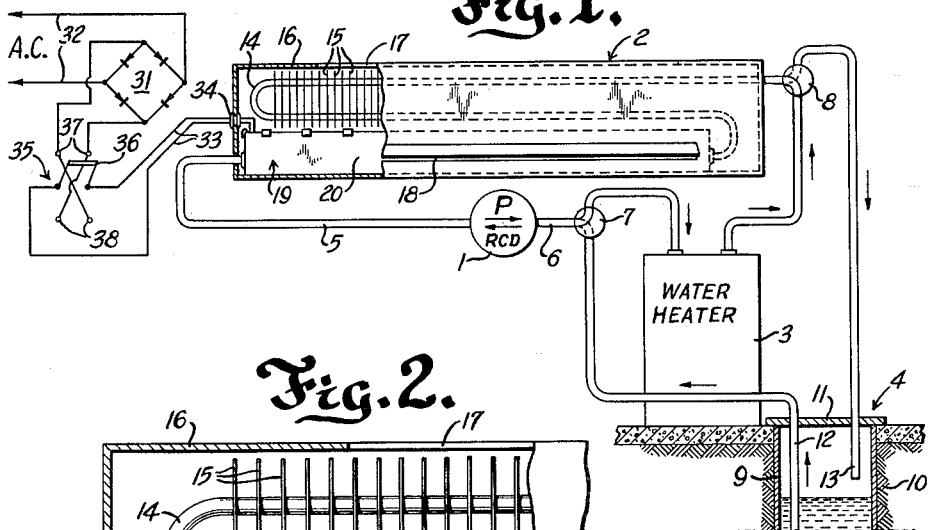
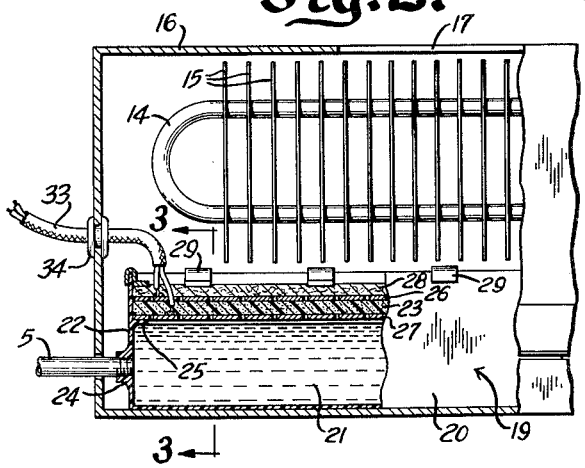
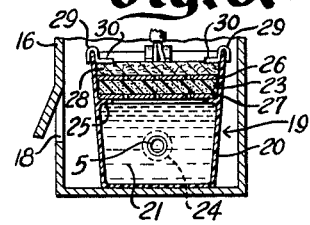
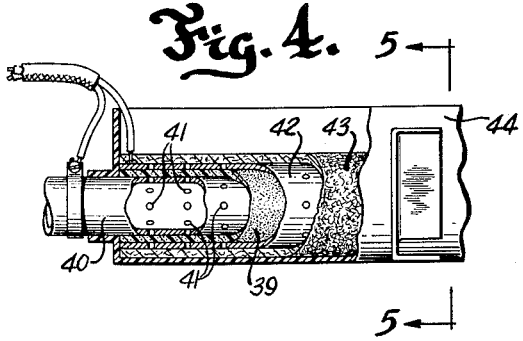
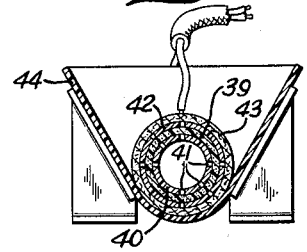
INVENTOR.
FRANCIS W. LAUCK

3,092,179
ELECTRO-OSMOTIC HUMIDITY CONTROL
Francis W. Lauck, Greenfield, Wis., assignor to A. O. Smith Corporation, Milwaukee, Wis., a corporation of New York
Filed Sept. 14, 1959, Ser. No. 839,771
7 Claims. (Cl. 165—60)

This invention relates to an electro-osmotic humidity control and is particularly directed to a humidity control device which is adapted for connection in a temperature regulating unit employing water as the heat transfer medium.

In regulating the temperature of the air in residential dwellings, office buildings and the like, a closed water system may be employed as the heat transfer medium. Suitable heat exchange units are provided in the areas to be temperature regulated and water is passed through the units to either give up or pick up heat from the adjacent air in accordance with the desired air temperature. Normally the water is sealed in a closed pressurized circulating system.

During heating periods, the air tends to be quite dry because there is no opening in the temperature regulating system through which water can be introduced into the air, such as in the conventional hot air system. Normally open water pans are mounted adjacent each of the heat transfer units and are periodically refilled with water as the water evaporates into the air to prevent excessive dryness. The adjacent heat exchange units increase the temperature of the water, which vaporizes and passes into the air to provide moisture in the air. If sufficient water is supplied to the pan, the humidity can be maintained at a comfortable level.

However, such forms of humidity control do not allow accurate control of the humidity and require constant attention by the consumer.

In accordance with the present invention, an electro-osmotic humidity control includes an in-line connecnection in the water system within the area which is being temperature regulated to carry at least a portion of the heat exchange water. A porous membrane or diaphragm is provided separating the water from the air. Electrode means are mounted on opposite sides of the diaphragm and by suitable polarity control, water is introduced or removed from the air.

The invention is based upon standard electro-osmosis phenomena of the movement of a fluid through a porous diaphragm incident a difference of electric potential created between electrodes on opposite sides of the diaphragm. The phenomena is believed to result from the opposite electrification of the liquid and the diaphragm.

Thus, in accordance with the present invention, a porous member defines a portion of the water conduit for the heat transfer water within the area which is to be temperature and humidity regulated. Suitable electrodes are secured to the opposite faces of the porous partition and by selection of the polarity, water may be withdrawn from the water system and introduced into the adjacent air or water may be withdrawn from the air and introduced into the water system.

The humidity control may be employed entirely independently of associated heating or cooling devices but is particularly adapted for use in connection therewith.

As applied to the modern cooling unit, a water accumulating tray or the like is mounted below a finned heat exchange device over which the air passes and a portion of the heat exchange water passes through the tray. An osmotic membrane having suitable electrodes on opposite surfaces defines a portion of the water conduit through the tray. The electrodes are connected to a suitable direct current source with a polarity which tends to carry the water from the exterior of the conduit into the conduit. As the cool water passes through the heat exchange unit, it absorbs heat from the adjacent air in the conventional manner to cool the air. Incident to the cooling phenomena, moisture condenses on the finned heat exchange device and drips downwardly into the tray and overlies or covers the osmotic membrane. The accumulating condensed moisture is continuously carried into the closed-fluid system and discharged to a suitable drain.

During a heating cycle, the potential applied to the osmotic membrane is reduced or reversed to allow withdrawal of water from the system and accumulation of the water in the tray to add moisture to the air. The water is heated by the adjacent heat-exchange unit and is carried away with the air which passes over the heat-exchange unit.

The pressure in the water system continuously biases water outwardly through the porous osmotic membrane. The membrane can be selected to allow water passage in the absence of an applied potential. A potential is then impressed across the membrane to oppose the water passage and thus regulate the direction and level of water flow by varying the value of the potential.

Alternatively, the membrane can be selected to substantially prevent outward water passage in the absence of the impressed potential. The potential must then be so applied as to force the water outwardly through the membrane. During a cooling period the potential is necessarily reversed to force water into the system.

An automatic humidity control responsive to the moisture in the air may be provided to automatically turn the power to the electro-osmotic control on and off and thus provide completely automatic control of the humidity.

The drawing furnished herewith illustrates the best mode presently contemplated for carrying out the invention.

In the drawing:

FIG. 1 is a schematic-fluid diagram of a hot water air treating or regulating system including a unified heat-exchange unit and an electro-osmotic humidifier in accordance with the present invention;

FIG. 2 is an enlarged fragmentary vertical section of the humidifier shown in FIG. 1;

FIG. 3 is a vertical section taken on line 3—3 of FIG. 1;

FIG. 4 is a front elevational view with parts broken away of an alternative embodiment of the invention;

FIG. 5 is a vertical section taken on line 5—5 of FIG. 4.

Referring to the drawing and particularly to FIG. 1, a residential type heating and cooling water unit or system is diagrammatically illustrated. The system generally includes a reversible fluid pump 1 which is adapted to circulate water, not shown, through one or more heat and moisture exchange units 2.

Only one of the heat and moisture exchange units 2 is shown for purposes of clarity and simplicity of explanation. It will be readily understood that generally a plurality of such units will be disposed throughout the several areas of the dwelling or building, not shown.

A heating unit 3 and a well 4 are selectively interconnected with the pump 1 and the heat and moisture exchange unit 2. The heating unit 3 constitutes a source of hot water employed during the heating cycle. The well 4 constitutes a source of cold water for cooling or reducing the temperature of the air during a cooling cycle.

Pump 1 is a conventional, standard reversible pump which is driven in any suitable manner such as by an electric motor, not shown. A conduit 5 connects the one side of the pump 1 directly to one side of the heat and moisture exchange unit 2. A conduit 6 connects the opposite side of the pump 1 to a control valve 7 which is adapted to selectively direct the water with respect to the pump 1 to the input of the heating unit 3 or from the output of the well 4. A control valve 8 is connected to the opposite end of the heat and moisture exchange unit 2 and connects the corresponding side to the output of the heater 3 or to the return or discharge side of the well 4. Valves 7 and 8 are ganged for simultaneous connection of the heater 3 or the well 4 in the fluid circuits described.

The heater 3 is any conventional unit adapted to increase the temperature of the circulating water and normally includes a boiler or the like which maintains a reservoir of hot water during the heating season.

Valves 7 and 8 are manually or automatically controlled to assume the full line position shown in FIG. 1 during a demand for heat by the air being temperature regulated. In the full line position, the fluid flow is from the pump 1 to the heater 3 and then through valve 8 to the heat and moisture exchange unit 2 before passing back to the pump. The pump 1 is conventionally automatically controlled by a standard thermostatic unit, not shown, to circulate hot water in response to a demand for heating of the air.

The well 4 is illustrated as a conventional deep well having an outer well casing 9 which is driven into the ground 10 and sealed by an upper cap 11. A first pipe 12 extends downwardly through the casing 9 to allow withdrawal of well water. A second pipe 13 extends downwardly to allow discharge of the water back into the well.

The control valves 7 and 8 are connected respectively to pipes 12 and 13 to selectively connect the well into the circuit only during a cooling cycle. Thus, when there is a demand for cooling of the air, the valves 7 and 8 assume the dotted line position, either through a manual or automatic control, not shown.

The well 4 is shown as a source of cool water for purposes of simplicity of illustration. Any other suitable source of cooling water, such as a condenser unit, may also be employed.

Referring to FIGS. 1-3, the heat and moisture exchange unit 2 includes a horizontally opening U-shaped water pipe 14 through which the water passes to effect a heat exchange with the surrounding air. The horizontal arms of the water pipe 14 are generally relatively long and closely vertically spaced. A plurality of plate-like fins 15 are secured to the horizontal arms of the water pipe 14 with a relatively tight fit therebetween. The fins 15 constitute an extended heat exchange surface in accordance with standard practice.

The water pipe 14 and the assembled fins 15 are housed within a suitable decorative sheet metal case 16 having a top wall opening 17 and a front wall opening 18 to allow air to circulate through the casing and over the heat exchange water pipe 14 and fins 15.

A humidity control unit 19 is mounted within the casing 16 immediately below the water pipe 14 and the fins 15 adjacent the lower opening 18. The unit 19 is horizontally spaced from opening 18 to allow free movement of air into casing 16.

The illustrated humidity control unit 19 includes an open-top water pan 20 which is connected in the fluid circuit to pass the circulating water 21 through the previously described heating and cooling circuits. The pan 20 is formed of a plastic or other suitable insulating material and is generally U-shaped in cross section with integral end walls 22. An osmotic membrane or partition 23 seals the open top of the pan 20 to maintain the pressure in the system and to allow fluid transfer throughout the circuit.

Suitable pipe couplings 24 are provided in the end walls 22 and receive, respectively, the adjacent lower end of water pipe 14 and the conduit 5 to pump 1.

An internal annular ledge 25 is provided on the vertical walls of the pan 20 to carry the osmotic partition 23. The partition 23 is sandwiched between a top perforated plate electrode 26 and a lower perforated plate electrode 27. A wick 28 of loose felt or other similar material overlies the top plate electrode 26. A series of spring clips 29 are secured over the upper edge of the pan 14 and include horizontally extending spring legs 30 which establish a force on the upper surface of the wick to clamp the partition assembly between the supporting ledge 25 and the clip legs 30. The force established on the upper surface of the wick is sufficient to maintain the pressure in the circulating fluid system.

The partition 23 is formed of tight felt, porous plastic or the like which is normally sufficiently impervious to water to prevent escape of water from the fluid system. However, by suitable application of a direct current potential to the electrodes 26 and 27, a current flow is established which transports water into or out of the fluid system, in accordance with the direction of the potential. If the top electrode 26 is negative and the lower electrode is positive, water tends to flow into the system. Conversely, to establish water flow from the system, the potential of the electrodes 26 and 27 is reversed.

As previously described partition 23 may also be selected to allow outward flow of water due to the pressure established by pump 1. The direct current potential applied to electrodes 26 and 27 is then selected to oppose the water flow. Thus, the top electrode is made negative and the lower electrode made positive.

The electrodes 26 and 27 are suitably apertured to allow the free flow of water therethrough. The electrodes are formed of a suitably non-corrosive and high conductivity material.

Referring to FIG. 1, a full wave rectifier 31 is connected to a set of suitable incoming alternating current power lines 32 to provide a direct current potential output across the output lines 33. The full wave rectifier 31 is preferably the conventional dry plate variety to provide an inexpensive and readily available unit.

The incoming lines 32 may be the conventional 110 volt alternating current power found in typical residential dwellings.

The direct current lines 33 are connected to the electrode plates 26 and 27 and pass outwardly through a grommeted opening 34 in casing 16 to the output of the rectifier 31.

A reversing switch 35 is interposed in the lines 33 to control the relative potential of electrodes 26 and 27. The reversing switch 35 is a conventional double pole, double throw variety having a switch arm 36 adapted to engage a first set of contacts 37 or a second set of contacts 38. Switch arm 36 is connected to the lines 33 leading to plates 26 and 27 and the contacts 37 and 38 are reversely connected to the output of rectifier 31.

The switch arm 36 may be either manually or automatically controlled to remove water from the fluid system or to force water into the fluid system, as more fully described hereinafter.

In one position of switch arm 36, the upper plate electrode 26 is connected to the positive terminal of the rectifier 31 and the lower plate electrode 27 is connected to the negative terminal of the rectifier. In the other position, the negative terminal is connected to the upper plate electrode 26 and the positive terminal is connected to the lower plate electrode 27.

Assume that a heating cycle is to be established and that valves 7 and 8 are positioned accordingly into the full line position. The pump 1 is then energized to circulate hot water through the heat and moisture exchange unit 2. The fluid flow is through the heat exchange water pipe 14 where the air in passing over the pipe and attached fins 15 absorbs heat from the water.

The switch arm 36 is thrown to the full line position with the positive terminal connected to the upper plate electrode 26 and the negative terminal connected to the lower plate electrode 27. In this position, the current flow through the partition 23 causes water to be carried upwardly through the partition and saturates the wick 28. The water vaporizes and is carried into the room with the air passing upwardly and over the heat exchange water pipe 14 and attached fins 15.

Thus a continuous supply of water is provided which allows a constant introduction of moisture into the air to establish automatic humidity control.

During a cooling cycle, the valves 7 and 8 are reversely disposed in the dotted line position to connect the well 4 in circuit with the pump 1 and the heat and moisture exchange unit 2. The switch arm 36 is also positioned to the dotted line position to reverse the potential applied to the electrodes 26 and 27 and to thereby reverse the direction of water movement through the partition 23.

During a cooling cycle, cold water from well 4 is passed through the heat and moisture exchange unit 2. The hot air in the adjacent area gives up its heat to the cool water and is thus reduced in temperature.

As the air is cooled, the capacity to carry water is reduced and moisture condenses onto the fins 15 and pipe 14. This moisture drips downwardly and accumulates within the upper portion of the pan 20, being absorbed by the wick 28. The potential applied to the electrodes 26 and 27 establishes a current which continuously carries the accumulating fluid into the closed water system.

Thus, the present invention provides a very simple and positive means of providing a continuous and automatic humidity control system.

Referring particularly to FIGS. 4 and 5 of the drawing, a second embodiment of the invention is illustrated which may be employed independently of a heating or cooling system.

Referring particularly to FIGS. 4 and 5, a tubular osmotic partition 39 encircles a portion of a water conduit pipe 40 which is connected in a pressurized water system. A plurality of apertures 41 are provided in the pipe 40 generally coextensive with the partition of 39. An outer tubular electrode 42 encircles the partition 39 and tightly clamps the partition about the apertured pipe 40 to substantially seal off the pipe and prevent liquid leakage under normal conditions. A tubular wick 43 encompasses the outer electrode to maintain moisture adjacent to the partition. A U-shaped pan 44 is disposed coextensive with the diaphragm 39 to prevent direct contact of the moist wick 43 with adjacent surfaces.

Generally the invention illustrated in FIGS. 4 and 5 functions in the same manner as that shown in FIGS. 1–3. Power is connected to the pipe 40 and to the outer tubular electrode 42 in accordance with the desired direction of fluid flow into or from the air.

The present invention provides a simple, automatic humidity control unit for incorporation into a closed water air treating or temperature regulating system. The humidity control unit avoids the necessity of periodic replenishment of the water supply as in the conventional systems and is consequently particularly adapted for use in dwellings, offices, and the like.

Various modes of carrying out the invention are contemplated as being within the scope of the following claims particularly pointing out and distinctly claiming the subject matter which is regarded as the invention.

I claim:

1. A combined heat exchange and humidity control device for conditioning air with a closed pressurized water system, a finned heat exchanger having a water conduit constituting a part of the water system, an electro-osmotic carrier disposed beneath the heat exchanger and including water accumulating means having an electro-osmotic diaphragm means generally in alignment with the finned heat exchanger to collect water or condensation from the heat exchanger, means to connect said water accumulating means to a water source for the selective removal and introduction of water, with respect thereto, said electro-osmotic diaphragm being positioned in relation to the finned heat exchanger whereby heating of the finned member is effective to evaporate water from the outer surface of the electro-osmotic diaphragm, and means to impress a direct current potential upon the electro-osmotic conduit unit to determine the movement of water into and from the accumulating means through said electro-osmotic diaphragm means and control the movement of water through said diaphragm in correspondence with said condensation or evaporation and to thereby regulate the humidity of the air.

2. A combined heat exchange and humidity control device for treating air with a closed pressurized water system, a heat exchange conduit portion mounted in exchange relation with the air, an open top pan disposed beneath the conduit portion and in series with the heat exchange conduit portion to carry heat exchange water, a diaphragm secured to open top of the pan and substantially closing the pan to maintain the pressurized water system, electrode means secured to opposite sides of the diaphragm, a decorative casing enclosing the heat exchange conduit portion and the pan, said casing including openings allowing flow of air through the casing, and direct current power means connected to said electrode means to establish fluid flow through said diaphragm by electro-osmosis.

3. A humidity control device for an air treating unit having a closed pressurized water system including a heat exchange conduit portion, an open top pan disposed beneath the conduit portion, means to interpose the pan in series with the heat exchange portion to carry heat exchange water, an osmotic diaphragm closing the top of the pan, electrode means secured to opposite sides of the diaphragm, and direct current power means connected to said electrode means to establish fluid flow through said diaphragm by electro-osmosis.

4. A humidity control device for an air treating unit having a closed pressurized water system including a heat exchange conduit portion, an open top pan adapted to be disposed beneath the conduit portion, means to connect an inner ledge encircling the pan in series with the heat exchange portion to carry heat exchange water, a porous diaphragm spanning the open top of the pan, upper and lower plate electrodes mounted in engagement with opposite sides of the porous diaphragm, a wick covering the upper plate electrode, clip means to clamp said wick and electrodes and diaphragm to the ledge to seal the pan and maintain the pressurized water system, and direct current power means connected to said electrodes to selectively establish fluid flow through said diaphragm by electro-osmosis.

5. A humidity control device for an air treating unit having a closed pressurized water system including a heat exchange conduit portion, a perforated metallic conduit connected in series in the water system, a diaphragm overlying the perforated conduit to prevent liquid leakage, an electrode secured to the outer surface of the diaphragm, and direct current power means connected to said electrode and said perforated metallic conduit to establish fluid flow through said diaphram by electro-osmosis.

6. A humidity control device for an air treating unit having a closed pressurized water system including a heat exchange conduit portion, a perforated metallic conduit connected in series in the water system in the area to be humidity controlled, a tubular diaphragm encircling the perforated conduit to prevent liquid leakage, a tubular electrode coaxially secured to the outer surface of the diaphragm, a tubular wick coaxially secured to the outer surface of the last named electrode, direct current power means connected to the metallic conduit adjacent the perforated portion and to the electrode to establish fluid flow through said diaphragm by electro-osmosis, and a water accumulating pan associated with the perforated conduit to retain water accumulating adjacent the wick.

7. In a humidity control device in combination with a pressurized fluid flow system for controlling the humidity in the surrounding atmosphere, a container disposed in series with said system with openings therein to receive and carry off fluid flowing in the system and having at least one additional opening exposed to the surrounding atmosphere, an osmotic diaphragm extending over the last named opening in the container and with the inside of the diaphragm exposed to the fluid in the container and the opposite side of the diaphragm exposed to the surrounding atmosphere, electrode means having a plurality of openings therein and disposed over the fluid side of the diaphragm, a second electrode means having a plurality of openings therein and disposed over the atmospheric side of the diaphragm, and means to apply direct current power to the electrode means to establish current flow through the diaphram and thereby regulate the direction and rate of movement of fluid therethrough to control the humidity of the atmosphere with which the device is in contact.

References Cited in the file of this patent

UNITED STATES PATENTS

| | | |
|---|---|---|
| 1,887,767 | Lewis | Nov. 15, 1932 |
| 2,292,608 | Buckman et al. | Aug. 11, 1942 |
| 2,691,134 | Ford | Oct. 5, 1954 |
| 2,849,358 | Bergman et al. | Aug. 26, 1958 |